US005675307A

United States Patent [19]

Krimm et al.

[11] Patent Number: 5,675,307

[45] Date of Patent: Oct. 7, 1997

[54] PTC DEVICE WITH EXTENDED THICKNESS

[75] Inventors: John J. Krimm, Columbus; Jeffrey A. West, Bellville; Robert L. Newman, Mansfield, all of Ohio

[73] Assignee: Therm-O-Disc, Incorporated, Mansfield, Ohio

[21] Appl. No.: 520,709

[22] Filed: Aug. 29, 1995

[51] Int. Cl.$^{6}$ .............................. H01H 61/00; H02H 5/04

[52] U.S. Cl. ............................ 337/107; 337/102; 361/24; 361/105; 310/239

[58] Field of Search ..................................... 337/102–107; 361/23, 241, 27, 103, 106; 310/239; 318/778, 782, 791

[56] References Cited

U.S. PATENT DOCUMENTS

| | | | |
|---|---|---|---|
| Re. 31,367 | 8/1983 | D'Entremont | 361/27 |
| 3,914,727 | 10/1975 | Fabricius | 361/27 X |
| 4,084,202 | 4/1978 | Stoll | 361/24 |
| 4,241,370 | 12/1980 | De Filippis et al. | 361/24 |
| 4,604,602 | 8/1986 | Brozoni | 337/264 |
| 4,689,595 | 8/1987 | Jorgensen | 337/107 |
| 5,153,805 | 10/1992 | Tennant et al. | 361/27 |

*Primary Examiner*—Leo P. Picard

*Assistant Examiner*—Jayprakash N. Gandhi

*Attorney, Agent, or Firm*—Jones, Day, Reavis & Poque

[57] ABSTRACT

A thin PTC device that includes a layer of PTC material sandwiched between a pair of metal plates is provided with an increased effective thickness by outwardly extending flanges on at least one of the metal plates. This allows a close fit of the PTC device in a pocket that otherwise would be too large for holding the PTC device properly.

35 Claims, 4 Drawing Sheets

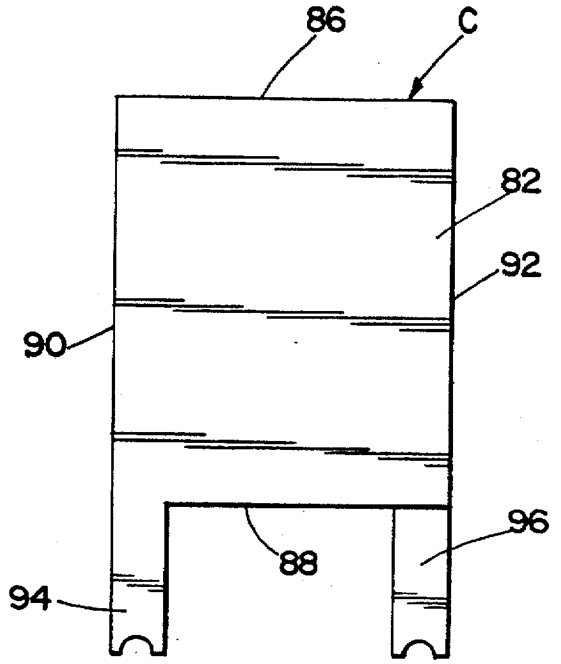
Fig. 4
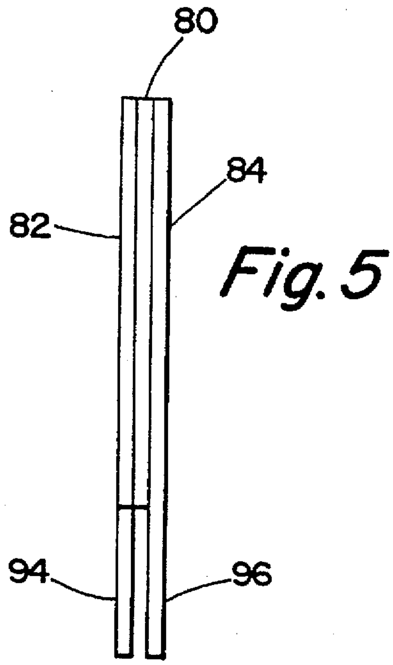
Fig. 5
Fig. 6
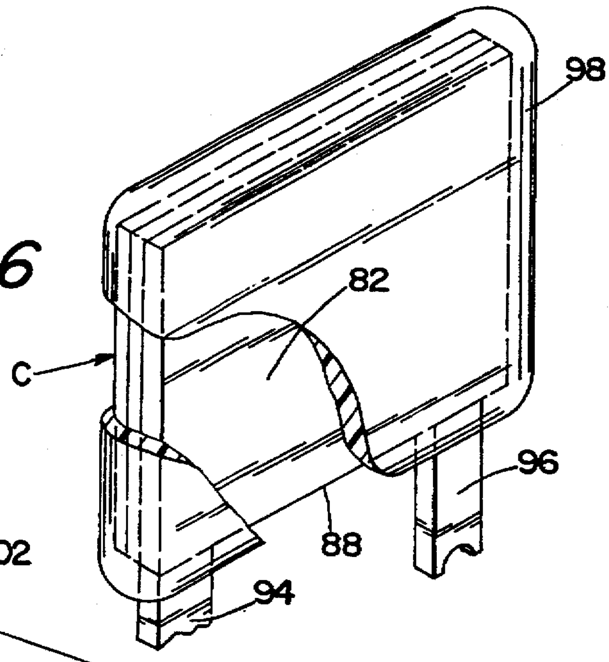
Fig. 7
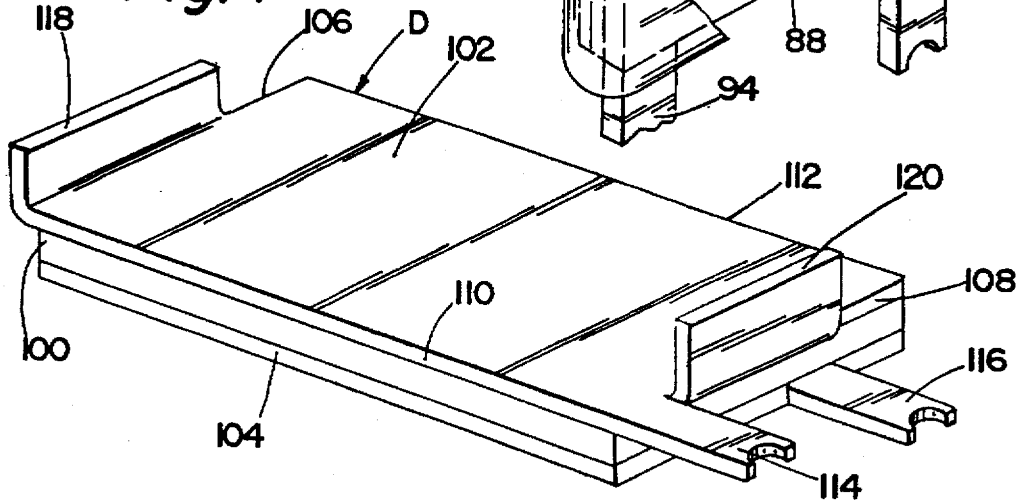

PTC DEVICE WITH EXTENDED THICKNESS

BACKGROUND OF THE INVENTION

This application relates to the art of thermal protectors and, more particularly, to thermal protectors that employ a material having a positive temperature coefficient (PTC) of resistance, such as a carbon filled polymer. The invention is particularly applicable for use in protecting electric motors and will be described with specific reference thereto. However, it will be appreciated that the invention has broader aspects and can be used for protecting electrical devices other than motors.

Small electric motors used in such applications as power windows and power seats in automobiles are commonly protected against overload by an electro-mechanical thermal protector. When a device operated by the motor stalls, the motor remains connected to a battery voltage source and the heat produced causes operation of an electro-mechanical thermal protector that disconnects the motor from the battery voltage source. When the thermal protector cools down, the motor will again be connected to the voltage source. If the problem has not been corrected, the electro-mechanical thermal protector will cycle on and off until the battery is completely drained.

Materials that have a positive temperature coefficient of resistance and exhibit a very large increase in resistance at a predetermined elevated temperature commonly are known as PTC materials. Thermal protectors that use PTC materials commonly are known as PTC devices.

PTC devices switch to a very high resistance state at a predetermined elevated temperature and a trickle current that continues to flow through the PTC material produces sufficient heat for maintaining the PTC device in its high resistance switched condition. The trickle current will not rapidly discharge the battery because the current used is comparable to that used for an automobile clock. The PTC device will not reconnect the motor to the battery until the problem has been corrected. Replacing electro-mechanical thermal protectors with PTC protectors is difficult and expensive because the electro-mechanical protectors are significantly larger than the PTC devices. Therefore, the PTC devices will not normally fit within a holder for an electro-mechanical thermal protector and a complete redesign of the holder would be necessary.

It would be desirable to have the capability of replacing electro-mechanical thermal protectors with PTC protectors without completely re-designing an entire holder in which the thermal protector is held.

SUMMARY OF THE INVENTION

A plastic motor brush holder includes a pocket for closely receiving an electro-mechanical thermal protector. One well-known type of electro-mechanical thermal protector is sold under the brand name "Otter". In accordance with the present application, a PTC device is provided with an increased effective thickness for close reception within a pocket that is sized for normally closely receiving an electro-mechanical thermal protector.

In accordance with one arrangement, the PTC device of the present application includes a central layer of PTC material that may be a carbon filled polymer. The material has a positive temperature coefficient of resistance so that there is normally very little resistance to current flow. At a predetermined elevated temperature, the PTC material automatically switches to its high resistance state in which only a very small trickle current will continue to flow. The trickle current is insufficient to damage the motor but is adequate to produce sufficient heat in the PTC material for maintaining it in its high resistance state until the problem is corrected.

The flat layer of PTC material has metal foil laminated to its opposite faces and the foil is soldered to a pair of opposite outer metal plates. Thus, the PTC material is sandwiched between a pair of metal plates.

The metal plates have top and bottom edges and opposite sides. Terminals extend downwardly from the bottom edges of the metal plates for connecting the PTC device in a circuit.

Flanges extend outwardly from edges of at least one of the plates for increasing the effective thickness of the PTC device. A top flange on at least one of the plates cooperates with a retainer in a pocket for holding the PTC device in the pocket.

Instead of providing flanges to increase the effective thickness, it will be recognized that it is possible to provide a layer of dielectric material over the metal plates for increasing the overall thickness of the PTC device.

It is a principal object of the present invention to provide an improved PTC device that can be used for replacing electro-mechanical thermal protectors.

It is also an object of the present invention to provide a PTC device with an increased effective thickness by forming outwardly extending flanges on the PTC device.

BRIEF DESCRIPTION OF THE DRAWING

FIG. 4 is a front elevational view of a PTC device constructed in accordance with the present application;

FIG. 5 is a side elevational view thereof;

FIG. 6 is a perspective illustration of another embodiment;

FIG. 7 is a perspective illustration of still another embodiment;

DESCRIPTION OF PREFERRED EMBODIMENTS

Figure 1:
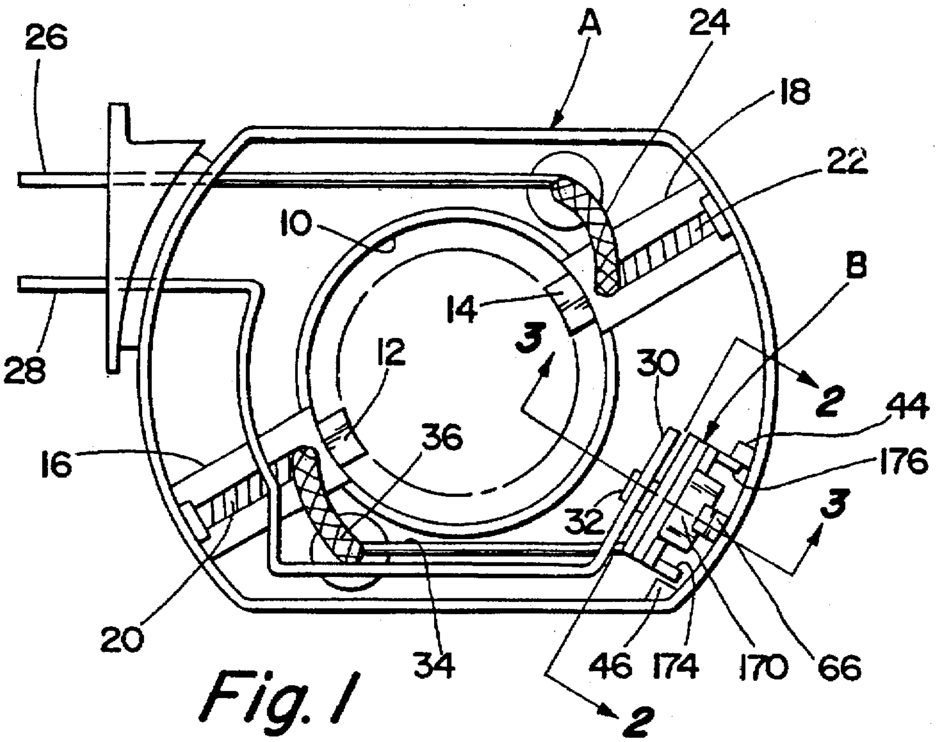
FIG. 1 is a top plan view of a motor brush holder having the PTC device of the present application positioned therein.

Referring now to the drawing, wherein the showings are for purposes of illustrating certain preferred embodiments of the invention only and not for purposes of limiting same, FIG. 1 shows a molded plastic motor brush holder having a central circular opening 10 for surrounding an unshown motor armature. Motor brushes 12,14 received in guides 16,18 are biased by springs 20,22 toward the center of opening 10 into engagement with the motor armature.

Motor brush 14 has a lead 24 connected with a plug-in terminal member 26. Another plug-in terminal member 28 extends past motor brush 12 toward PTC device B and includes a horizontal portion 30 that is supported in a recess in a support 32 located adjacent PTC device B. Horizontal portion 30 of terminal member 28 has an unshown downwardly extending terminal portion that is soldered to a terminal on PTC device B. The other terminal on PTC device B is soldered to a connecting wire 34 that is attached to lead 36 of motor brush 12.

Motor brush holder A is provided with a pocket for receiving a thermal protector. Pocket opposite sides 40,42 are defined on upstanding projections or side walls 44,46. Front and rear pocket surfaces 50,52 are defined between support wall 32 and an outer or rear wall 54.

Figure 2:
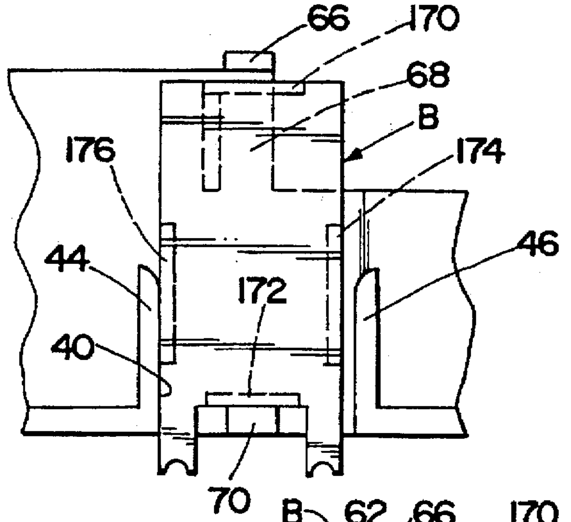
FIG. 2 is a partial cross-sectional elevational view taken generally on line 2—2 of FIG. 1.
Figure 3:
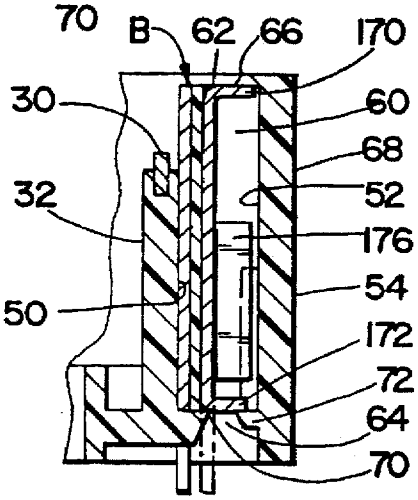
FIG. 3 is a partial cross-sectional elevational view taken generally on line 3—3 of FIG. 1.

The pocket for receiving the thermal protector is generally indicated by numeral 60 in FIG. 3 and includes top and bottom openings 62,64. An inwardly extending projection 66 on a resilient finger 68 provides a tab for retaining a thermal protector within pocket 60. Resilient finger 68 is shown in FIG. 2 and can be deformed outwardly to displace tab 66 and increase the size of top opening 62 for insertion of a thermal protector within pocket 60. Releasing finger 68 then moves tab 66 back to the position shown in FIG. 3 partially closing top opening 62 and partly overlying the top end of a thermal protector. Bottom abutments 70,72 extend inwardly of pocket 60 adjacent bottom opening 64 for reducing the width of the bottom opening.

FIGS. 4–6 show a PTC device C that includes a central flat layer of PTC material 80 sandwiched between a pair of generally rectangular flat metal plates 82,84. The periphery of PTC device C includes top and bottom edges 86,88 and opposite sides 90,92. Plate 82 has a terminal leg 94 projecting from bottom end 88 in alignment with side 90. Plate 84 has a terminal leg 96 projecting from bottom end 88 thereof adjacent side 92. PTC device C is encapsulated in dielectric material 98 as shown in FIG. 6 for increasing the effective thickness thereof.

FIG. 7 shows a PTC device D that includes a layer of PTC material 100 sandwiched between opposite flat and rectangular metal plates 102,104. The periphery of PTC device D and of plates 102,104 includes top and bottom ends 106,108 and opposite sides 110,112. A terminal leg 114 projects outwardly from bottom end 108 of plate 102 adjacent side 110, and another terminal leg 116 projects outwardly from bottom end 108 of plate 104 intermediate opposite sides 110,112. Flanges 118,120 are bent outwardly from plate 102 at top and bottom ends 106,108 thereof for effectively increasing the thickness of PTC device D.

Figure 8:
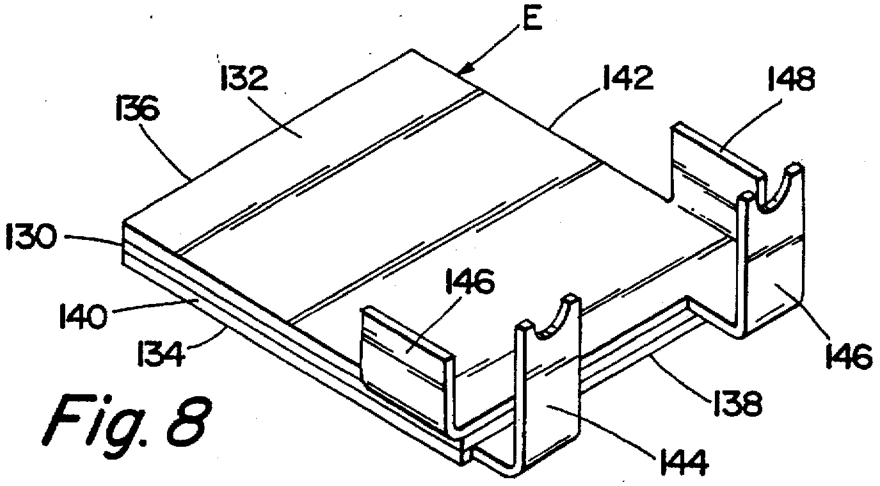
FIG. 8 is a perspective illustration of still another embodiment.

FIG. 8 shows a PTC device E having a middle layer of PTC material 130 sandwiched between a pair of flat rectangular plates 132,134. PTC device E and plates 132,134 have an outer periphery that includes top and bottom ends 136,138 and opposite sides 140,142. A terminal leg 144 extends outwardly from bottom end 138 of plate 134 and another terminal leg 146 extends outwardly from bottom end 138 of plate 132. Terminal legs 144, 146 are bent substantially perpendicular to plates 132,134. Flanges 146,148 are bent outwardly from opposite sides 140,142 of plate 132 adjacent bottom end 138 thereof. Flanges 146,148 increase the effective thickness of PTC device E and are substantially perpendicular to their respective plates.

Figure 9:
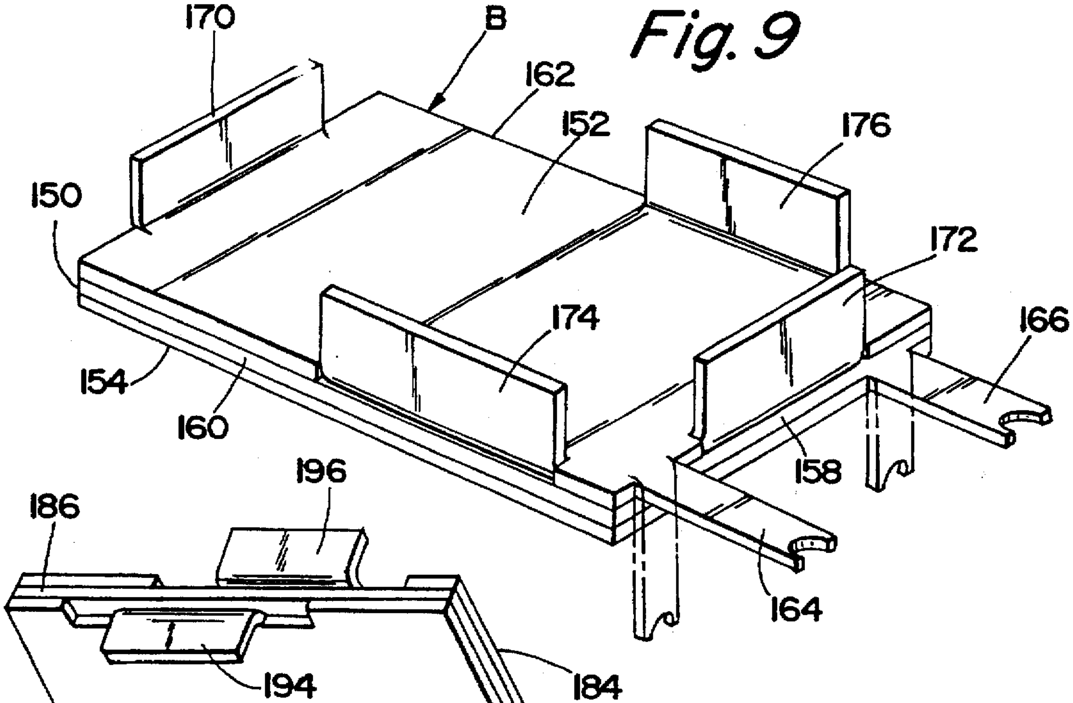
FIG. 9 is a perspective illustration of still another embodiment.

FIG. 9 shows PTC device B having a central layer of PTC material 150 sandwiched between a pair of flat rectangular plates 152,154. PTC device B and plates 152,154 have a periphery that includes top and bottom ends 156, 158 and opposite sides 160,162. A terminal leg 164 extends outwardly from bottom end 158 of plate 152 and a terminal leg 166 extends outwardly from bottom end 158 of plate 154. Terminal legs 164,166 may be bent as indicated by shadow lines in FIG. 9. Top and bottom flanges 170,172 are bent outwardly substantially perpendicular to plate 152 at top and bottom ends 156,158 thereof. Opposite side flanges 174,176 are bent outwardly from opposite sides 160, 162 of plate 152. Top and bottom flanges 170,172 are preferably located intermediate opposite sides 160,162 and have a width that is substantially less than the length of top and bottom ends 156, 158. In addition, flanges 170,172,174 and 176 are bent such that their outer surfaces are located on or inwardly of the outer periphery of PTC device B and of plates 152,154.

Figure 10:
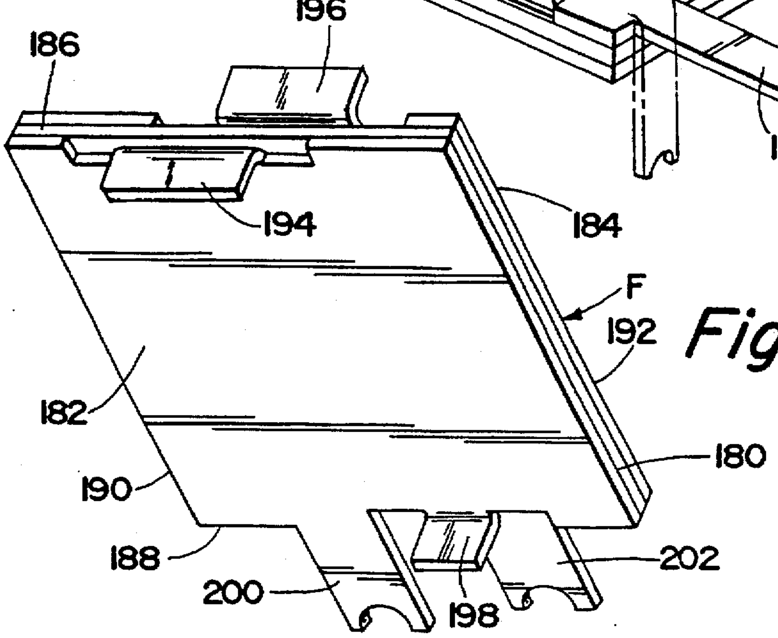
FIG. 10 is a perspective illustration of still another embodiment.
Figure 11:
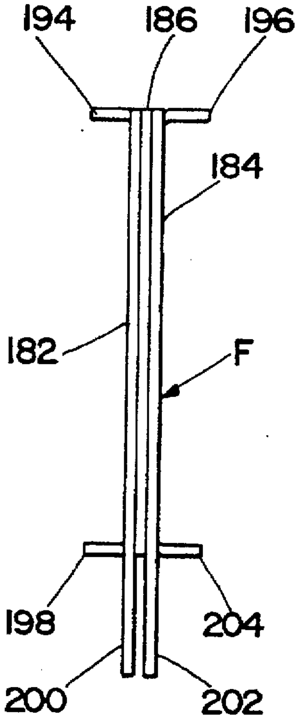
FIG. 11 is a side elevational view of still another embodiment.

FIG. 10 shows a PTC device F that includes a central layer of PTC material 180 sandwiched between a pair of rectangular metal plates 182, 184. PTC device F and plates 182, 184 have top and bottom ends 186,188 and opposite sides 190, 192. Top flanges 194,196 are bent outwardly from plates 182,184 adjacent top end 186 thereof. A bottom flange 198 is bent outwardly from plate 182 adjacent bottom end 188 thereof. Terminal legs 200,202 project outwardly from bottom end 188 of plates 182,184 intermediate opposite sides 190,192. Plate 184 in FIG. 10 has a bottom flange corresponding to flange 198 that is shown at 204 in FIG. 11.

Figure 11A:
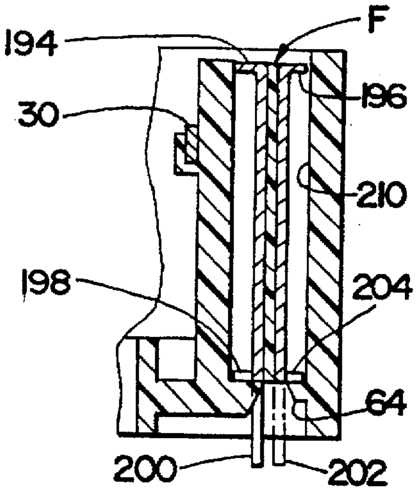
FIG. 11*a* is a partial cross-sectional elevational view similar to FIG. 3 and showing the PTC embodiment of FIG. 11 received in a pocket.

**FIG. 11*a* shows PTC device F received in a pocket 210 having a thickness substantially greater than the thickness of PTC device F between the outer surfaces of plates 182,184. Flanges 194,196 and 198,204 increase the effective thickness of PTC device F so that it is a close fit within pocket 210 as shown in FIG. 11*a*. Flanges 198,204 also cooperate with abutments adjacent the bottom of pocket 210 for retaining PTC device F therein while allowing terminal legs 200,204 to project through narrow pocket bottom opening 64**.

Figure 12:
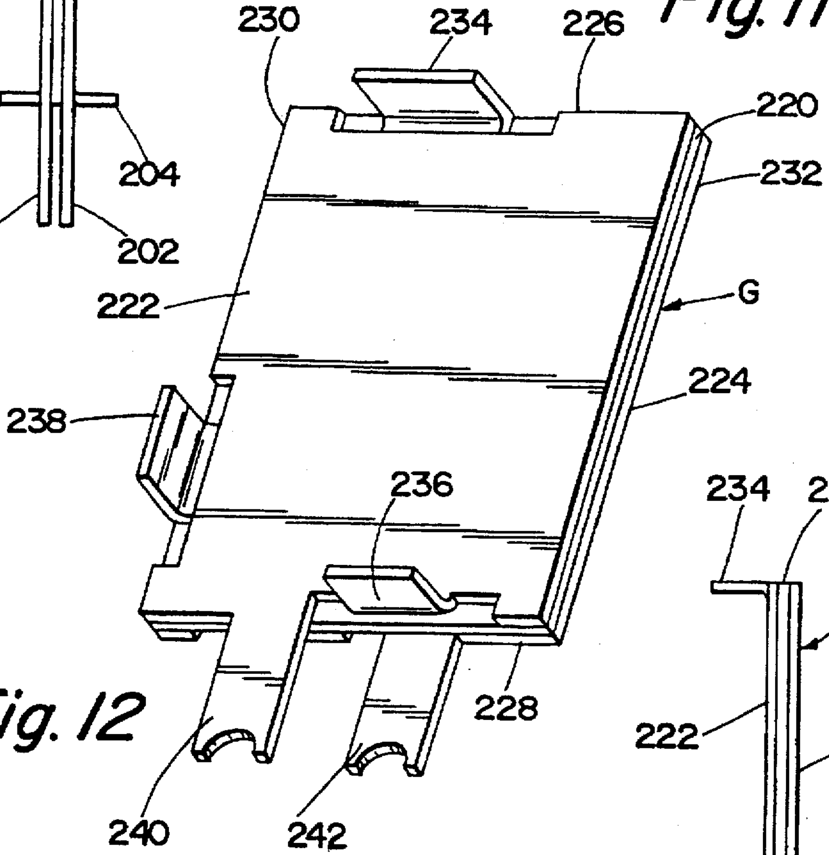
FIG. 12 is a perspective illustration of still another embodiment.
Figure 13:
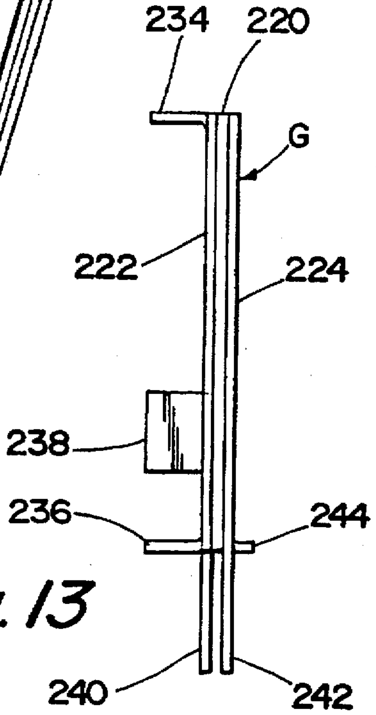
FIG. 13 is a side elevational view of the PTC device of FIG. 12.

FIGS. 12 and 13 show PTC device G having a layer of PTC material 220 sandwiched between opposite rectangular metal plates 222,224. PTC device G and plates 222,224 have an outer periphery that includes top and bottom ends 226, 228 and opposite sides 230,232. A top flange 234 is bent outwardly from plate 222 adjacent top end 226 thereof intermediate opposite sides 230, 232. A bottom flange 236 is bent outwardly from bottom end 228 of plate 222 intermediate opposite sides 230,232. Another flange 238 is bent outwardly from plate 222 adjacent side 230 thereof. Flanges 234,236 and 238 provide an increased effective thickness for PTC device G. Plate 222 is notched adjacent the opposite sides of flanges 234,236 and 238 so that these flanges can be bent with their outer surfaces located on or inwardly of the periphery of PTC device G and of plate 222. Terminal legs 240, 242 project outwardly from plates 222,224 intermediate opposite sides 230,232. A small bottom flange 244 extends outwardly from plate 224 opposite from flange 238 as shown in FIG. 13.

Instead of bending the flanges outwardly substantially perpendicular to the plates, it will be recognized that it is possible to simply deform the plate material outwardly on an inclination in localized areas. When flanges are used, they allow increasing the effective thickness of a PTC device by at least two times. When the plates are deformed outwardly at an inclination in localized areas, the increased thickness would generally be less than two times the combined total thickness of the plates and PTC material.

Although the invention has been shown and described with respect to certain preferred embodiments, it is obvious that equivalent alterations and modifications will occur to others scaled in the art upon the reading and understanding of this specification. The present invention includes all such equivalent alterations and modifications, and is limited only by the scope of the claims.

We claim:

1. A thermal protector comprising a substantially flat layer of material that has a positive temperature coefficient of resistance and normally provides very little resistance to current flow while automatically switching to a very high resistance state at a predetermined elevated temperature to substantially block flow of all but a trickle current therethrough, said material having outer opposite faces, metal foil electrodes laminated to said opposite faces, a pair of opposite metal terminal plates soldered to said electrodes with said material sandwiched therebetween, said plates having top and bottom ends and opposite sides, a terminal leg extending from said bottom end of each of said plates for connecting said PTC device in an electric circuit, said plates having outer surfaces spaced-apart a thickness distance measured in a thickness direction substantially perpendicular to and between said outer surfaces, and means permanently attached to at least one of said plates and extending outwardly therefrom as a unitary part of said thermal protector for providing said thermal protector with an effective thickness measured in said thickness direction that is at least about two times said thickness distance for providing close reception of said thermal protector in a pocket having a pocket thickness that is about the same as said effective thickness of said thermal protector.

2. The thermal protector of claim 1 wherein said top and bottom ends and opposite sides define peripheral portions, said means comprising at least two flanges extending outwardly from at least two of said peripheral portions of at least one of said terminal plates integrally therewith and substantially perpendicular thereto.

3. The thermal protector of claim 2 wherein each of said peripheral portions has a length and at least one of said flanges has a length substantially shorter than the peripheral portion from which it extends.

4. The thermal protector of claim 3 wherein said thermal protector has an outer periphery and said flanges have outer surfaces located within said outer periphery.

5. The thermal protector of claim 1 wherein said terminal legs extend substantially parallel to said terminal plates.

6. The thermal protector of claim 1 wherein said terminal legs extend substantially perpendicular to said plates.

7. The thermal protector of claim 6 wherein said terminal legs extend in the same direction.

8. The thermal protector of claim 1 wherein said means comprises a dielectric coating in which said thermal protector is encapsulated.

9. A PTC device comprising a layer of PTC material sandwiched between and bonded to a pair of opposite terminal plates having top and bottom ends and opposite sides, each of said plates and said PTC material having substantially coextensive areas, a terminal leg extending outwardly from said bottom end of each of said plates, said top and bottom ends and said opposite sides defining a plate periphery, and a plurality of flanges integral with at least one of said plates and extending outwardly therefrom substantially perpendicular thereto along said plate periphery, said flanges being spaced from and independent of said terminals.

10. The PTC device of claim 9 wherein said flanges are on both of said plates and extend outwardly therefrom in opposite directions.

11. The PTC device of claim 9 wherein said flanges include top and bottom flanges on said top and bottom ends of at least one of said plates.

12. The PTC device of claim 9 wherein each said flange extends along a portion of said ends or sides a distance substantially less than the length of each of said ends or sides from which it extends.

13. The PTC device of claim 9 wherein said flanges include side flanges on said opposite sides of at least one of said plates.

14. The PTC device of claim 13 wherein said side flanges are adjacent said bottom ends.

15. A motor brush holder having a pocket for receiving a thermal protector for connection in circuit with an electric motor, said pocket having top and bottom pocket openings, a predetermined pocket thickness and a predetermined pocket width, a pocket abutment adjacent said pocket bottom opening, a PTC device received in said pocket and having a bottom end engaging said abutment, said PTC device comprising a substantially flat layer of PTC material sandwiched between a pair of substantially flat opposite terminal plates, said terminal plates having plate outer surfaces and said PTC device having a predetermined thickness between said plate outer surfaces that is substantially less than said pocket thickness, means permanently attached to at least one of said plates and extending outwardly therefrom for providing said PTC device with an effective thickness measured in the same direction as said predetermined thickness that is substantially greater than said predetermined thickness for close reception of said PTC device in said pocket, and terminal legs on said terminal plates extending through said pocket bottom opening for connection in circuit with an electric motor.

16. The PTC device of claim 15 wherein said means comprises dielectric material in which said PTC device is encapsulated.

17. The holder of claim 15 wherein said PTC device has a top end and said holder includes a tab overlying said top end for retaining said PTC device in said pocket.

18. The holder of claim 15 wherein said means comprises a plurality of flanges extending outwardly from at least one of said terminal plates integrally therewith, said flanges being separate and independent from said terminal legs.

19. A motor brush holder having a pocket for receiving a thermal protector for connection in circuit with an electric motor, said pocket having top and bottom pocket openings, a predetermined pocket thickness and a predetermined pocket width, a pocket abutment adjacent said pocket bottom opening, a PTC device received in said pocket and having a bottom end engaging said abutment, said PTC device comprising a substantially flat layer of PTC material sandwiched between a pair of substantially flat opposite terminal plates, said terminal plates having plate outer surfaces and said PTC device having a predetermined thickness between said plate outer surfaces that is substantially less than said pocket thickness, said terminal plates having terminal legs extending through said pocket bottom opening for connection in an electric motor circuit, and at least one of said plates having at least one integral flange extending outwardly substantially perpendicular thereto for providing said PTC device with an effective thickness along said flange measured in the same direction as said predetermined thickness that is substantially greater than said predetermined thickness for close reception of said PTC device in said pocket.

20. The holder of claim 19 wherein said PTC device has a top end and at least one of said plates has at least one said flange extending therefrom to define a top flange, and said holder having a tab overlying said top flange for retaining said PTC device in said pocket.

21. The PTC device of claim 19 wherein each of said plates has a plurality of said flanges extending therefrom and all of said flanges on one of said plates extend in the same direction and in an opposite direction from all of the flanges on the other of said plates.

22. The PTC device of claim 19 wherein said plates have top and bottom plate ends and opposite plate sides, and at least one of said plates has top and bottom flanges extending from said top and bottom plate ends and side flanges extending from said plate sides.

23. The holder of claim 22 wherein said side flanges are located adjacent said bottom plate end and extend along said plate sides a distance substantially less than the length of said plate sides.

24. The holder of claim 22 wherein each said flange extends substantially less than the full length of a plate end or side from which it extends, said top and bottom plate ends and said opposite plate sides define a plate outer periphery, and said flanges having outer surfaces located within said outer periphery.

25. A thermal protector comprising a substantially flat layer of material that has a positive temperature coefficient of resistance and normally provides very little resistance to current flow while automatically switching to a very high resistance state at a predetermined elevated temperature to substantially block flow of all but a trickle current therethrough, said material being sandwiched between and bonded to a pair of opposite metal terminal plates having top and bottom ends and opposite sides, said thermal protector having top and bottom ends and opposite sides that substantially coincide with said top and bottom ends and said opposite sides of said plates, a terminal leg extending from said bottom end of each of said plates at said bottom end of said thermal protector for connecting said thermal protector in an electric circuit, and a bottom flange extending outwardly from said bottom end of at least one of said plates integrally therewith, a direction from each said plate toward said material being an inward direction and a direction from each said plate away from said material being an outward direction, and said bottom flange extending in said outward direction.

26. The thermal protector of claim 25 wherein said flange is separate and independent from each said terminal leg and has a flange length along said bottom end from which it extends that is substantially less than the full length of said bottom end from which it extends.

27. The thermal protector of claim 25 including a top flange extending outwardly in said outward direction from said top end of at least one of said plates.

28. The thermal protector of claim 27 wherein said top and bottom flanges are on the same one of said plates.

29. The thermal protector of claim 27 wherein said top flange has a flange length along said top end from which it extends that is substantially less than the full length of said top end from which it extends.

30. A thermal protector comprising a substantially flat layer of material that has a positive temperature coefficient of resistance and normally provides very little resistance to current flow while automatically switching to a very high resistance state at a predetermined elevated temperature to substantially block flow of all but a trickle current therethrough, said material being sandwiched between and bonded to a pair of opposite metal terminal plates having top and bottom ends and opposite sides, said thermal protector having top and bottom ends and opposite sides that substantially coincide with said top and bottom ends and said opposite sides of said plates, a terminal leg extending from said bottom end of each of said plates at said bottom end of said thermal protector for connecting said thermal protector in an electric circuit, and a side flange extending outwardly from each of said opposite sides of at least one of said plates integrally therewith, a direction from each said plate toward said material being an inward direction and a direction from each said plate away from said material being an outward direction, and each said side flange extending in said outward direction.

31. The thermal protector of claim 30 wherein each said side flange has a side flange length measured along a said side from which it extends that is substantially less than the full length of each of said sides.

32. The thermal protector of claim 31 wherein said side flanges are located closely adjacent said bottom end of said one plate.

33. A thermal protector comprising a substantially flat layer of material that has a positive temperature coefficient of resistance and normally provides very little resistance to current flow while automatically switching to a very high resistance state at a predetermined elevated temperature to substantially block flow of all but a trickle current therethrough, said material being sandwiched between and bonded to a pair of opposite metal terminal plates, said plates having outer surfaces spaced-apart a thickness distance measured in a thickness direction substantially perpendicular to and between said outer surfaces, a thickness extension permanently attached to at least one of said plates and extending outwardly therefrom as a unitary part of said thermal protector for providing said thermal protector with an effective thickness measured in said thickness direction that is at least about two times said thickness distance for providing close reception of said thermal protector in a pocket, a direction from each said plate toward said material being an inward direction and a direction from each said plate away from said material being an outward direction, said thickness extension extending in said outward direction, a terminal leg extending from each said plate for connecting said thermal protector in an electrical circuit, said thickness extension being separate and independent from each said terminal leg, said material having an outer periphery, and at least a substantial portion of said thickness extension being located on or within said outer periphery.

34. The thermal protector of claim 33 wherein said thickness extension comprises a plurality of spaced-apart flanges integral with at least one of said plates.

35. The thermal protector of claim 34 wherein said thermal protector has a substantially rectangular outer periphery that includes top and bottom ends and opposite sides, said flanges extending from said outer periphery, each of said flanges having a length along a said end or side that is substantially less than the full length of a said end or side from which it extends.

* * * * *